United States Patent [19]

Crahay

[11] Patent Number: 4,628,179
[45] Date of Patent: Dec. 9, 1986

[54] METHOD OF IMPROVING THE STATE OF THE SURFACE OF A ROLL

[75] Inventor: Jean R. Crahay, Francorchamps, Belgium

[73] Assignee: Centre de Recherches Metalurgiques-Centrum Voor Research in de Metallurgie, Brussels, Belgium

[21] Appl. No.: 584,394

[22] Filed: Feb. 28, 1984

[30] Foreign Application Priority Data

Mar. 11, 1983 [LU] Luxembourg ............................ 84687

[51] Int. Cl.$^4$ ............................................ B23K 26/00
[52] U.S. Cl. ...................... 219/121 LH; 219/121 LM; 219/121 LJ
[58] Field of Search .................. 219/121 LM, 121 FS, 219/121 LH, 121 L, 121 LJ

[56] References Cited

U.S. PATENT DOCUMENTS 4,322,600  3/1982  Crahay ...................... 219/121 FS X

FOREIGN PATENT DOCUMENTS 56-116821  9/1981  Japan ............................ 219/121 LM
2069906  9/1981  United Kingdom ........ 219/121 LM

OTHER PUBLICATIONS

Grigor'yant's et al., "Structure and Hardness of Steel 45 after Irradiation with a $CO_2$ Laser", Metal Science and Heat Treatment, vol. 24, No. 9/10, Sep./Oct. 1982, pp. 629–632.

*Primary Examiner*—M. H. Paschall
*Attorney, Agent, or Firm*—Holman & Stern

[57] ABSTRACT

A method for treating the surface of a roll, e.g. for a rolling mill, by focusing a substantially continuous concentrated corpuscular beam, e.g. a laser beam or an electron beam, on the roll surface, guiding the beam to impinge on the roll surface in a helical path, and regulating the concentration of the beam, the relative speed of rotation of the roll, and the translation speed of the beam so that the ratio of the pitch of the helical path and the width of the path of the beam on the roll surface is less than 1.

10 Claims, 1 Drawing Figure

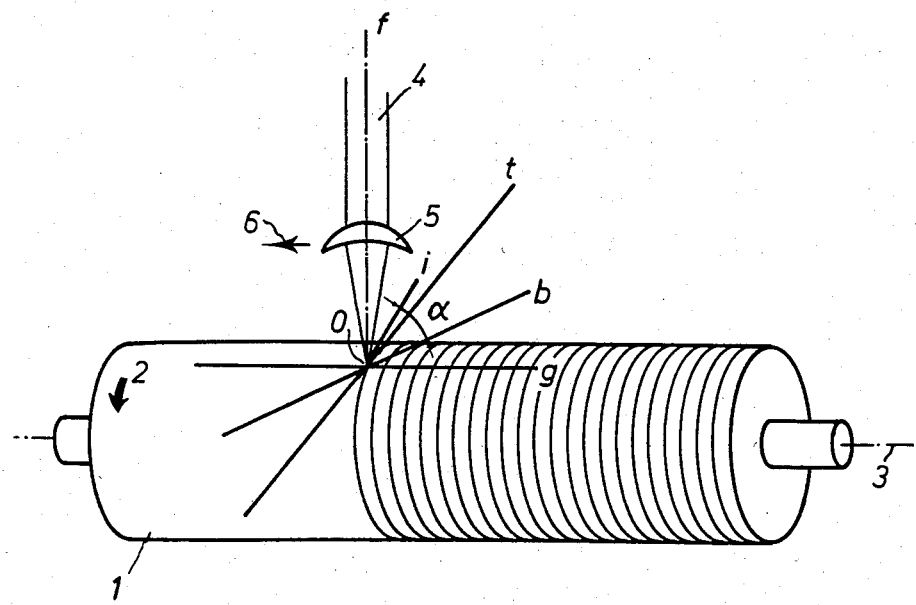

METHOD OF IMPROVING THE STATE OF THE SURFACE OF A ROLL

BACKGROUND OF THE INVENTION

1. Field of the Invention

The present invention relates to a method of improving the state of the surface of a roll, in particular of a rolling mill roll or continuous annealing roll, by means of a concentrated corpuscular beam, such as a laser beam or an electron beam.

2. Description of the Prior Art

It is known that the state of the surface of rolling mill rolls, in particular their roughness, determines the surface quality of the metal sheets to a very large extent. In particular, during reduction rolling, it is possible by means of suitable rolls to provide the sheets with a degree of roughness which enables the adhesion of the turns during coil annealing to be avoided. Moreover, the roughness of sheets which have been subject to temper rolling after annealing substantially affects their ability to undergo a shaping operation and to receive a coating.

Attempts have already been made to replace the random roughness of the rolls, such as results from shot blasting for example, with a deterministic type of roughness whose distribution could be mastered more easily.

In particular it has been proposed, in Belgian Pat. No. 880 996, to form microperforations on the surface of rolling mill rolls by means of a laser beam. According to this known method a continuous laser beam is rendered intermittent; then it is focused on the surface of the roll to be treated, where it locally destroys by fusion the material forming the roll. The entire surface is treated by rotating the roll about its axis and by displacing the concentrated beam, which thus scans the entire surface, parallel to this axis.

During these movements the impact zone of the beam on the roll surface describes a helical course along which the desired microperforations are distributed.

When it is desired to operate without rendering the beam intermittent, the roughness obtained has a high degree of anisotropy since it is constituted by a sort of "thread" which, during rolling, is transformed into lines in the surface of the sheet in the direction of rolling.

It is, however, suitable to reduce, or if possible to eliminate, this anisotropy since it impairs the appearance of the rolled sheets and harms the isotropy of their working properties. This latter effect is particularly undesirable in the case of press forming, for example deep drawing.

SUMMARY OF THE INVENTION

The present invention relates to a method enabling isotropic roughness to be provided on the surface of a roll by means of a concentrated corpuscular beam, which is continuous or partially intermittent and is designated below as substantially continuous.

The present invention provides a method in which the surface of a roll is treated by means of a concentrated corpuscular beam describing a helical course on the roll surface, a substantially continuous corpuscular beam being used and the concentration of the said beam and the relative rotational speed of the said roll and translation speed of the said beam are regulated in such a way that the ratio between the pitch of the said helical course and the width of the path of the said beam on the roll surface remains lower than 1 and preferably 0.85.

The present invention is based on the Applicant's observation according to which the desired isotropy of the roughness of the roll can only be attained if two successive paths of a laser beam on the roll surface have a sufficient overlap and not if they are simply contiguous as might have been expected.

In accordance with the invention, this limiting value is determined as a function of the roughness which it is desired to obtain, i.e. as a function of the acceptable difference in level between the crest of the rim and the base of the helical groove marked in the surface of the roll by the passage of the concentrated beam.

According to a particular way of performing the method the power of the concentrated beam and the rotational speed of the roll are adjusted so as to obtain the desired level of roughness, and then the translation speed of the beam is adapted as a function of the rotational speed of the roll in such a way that the pitch of the helical course remains lower than a critical value, i.e. it leads to a value of the said ratio which is less than its limiting value.

By way of example, which is solely intended to illustrate the method according to the invention, a satisfactory appearance of the surface has been obtained by ensuring a difference in level of at least 20 $\mu$m by means of a laser beam concentrated on a spot, having a diameter of 120 $\mu$m, describing a helix having a pitch equal to 100 $\mu$m. The ratio obtained in this case is equal to 0.83.

A gas, for example oxygen, may be injected into the impact zone of the laser beam and the direction, speed, pressure, and/or flow rate of the gas jet may be varied so as to modify the critical value of the helical pitch ensuring the desired degree of roughness.

In particular, this gas jet can be modulated or pulsed, for example by means of a rotating disc provided with apertures and interrupting the gas jet partially or totally in an appropriate manner.

BRIEF DESCRIPTION OF THE DRAWING

The accompanying drawing diagrammatically illustrates a way of performing the method according to the invention, including the use of an oxygen jet.

DETAILED DESCRIPTION

A roll 1 to be treated is rotated, according to the arrow 2, about its axis 3. A laser beam 4, with the axis f, is focused by a lens 5 and the concentrated beam strikes the surface of the roll at the point 0. The laser beam moves in translation according to the arrow 6 parallel to the axis 3. The point 0 describes a helical course. The plane tangential to the roll at the point 0 is represented by the generating line g of the roll and the tangent t perpendicular to the generating line g. A straight line b, which substantially bisects the angle g0t in the plane (g, t), forms a plane with the axis f of the beam, in which plane it is advantageous to inject oxygen. The direction i of the oxygen jet forms an angle $\alpha$, preferably between 15° and 80°, with the straight line b.

As described above the pitch of the helical course followed by the point 0 is less than the width of the concentrated laser beam at the point 0, the ratio preferably being less than 0.85.

I claim:

1. A method of forming an isotropic roughness in the form of a helical groove on the surface of a rolling mill roll comprising:

providing a substantially continuous corpuscular beam;

focusing said beam onto the outer peripheral surface of the roll;

rotating said roll about its longitudinal axis;

producing relative translational movement between said beam and said roll in the axial direction of the roll so that the area of impact of the beam on the surface of the roll traces a helical path on the surface of the roll;

adjusting the power of said beam at said impact area, the rotational speed of the roll and the speed of relative translational movement so that the beam produces a helical groove in the roll surface and the ratio of the pitch of the helical groove to the width of the beam at the area of impact is less than 1;

injecting a jet of gas in the impact zone of the beam on the roll surface; and varying at least one of the parameters of said gas jet to modify the critical value of said pitch of the helical groove to ensure a predetermined depth of the groove, said parameters comprising direction, speed, pressure and flow rate of said gas jet.

2. A method as claimed in claim 1 wherein the limiting value of the said ratio is 0.85.

3. A method as claimed in claim 1 wherein said adjusting steps comprise adjusting the power of the focused beam and the rotational speed of the roll to form a desired depth of the groove, and adjusting the translation speed of the beam as a function of the rotational speed of the roll so that the pitch of said helical groove produces said ratio less than 1.

4. A method as claimed in claim 1 wherein said gas comprises oxygen.

5. A method as claimed in claim 1 wherein said ratio is 0.83.

6. A method as claimed in claim 3 wherein:
said depth of the groove is approximately 20 $\mu$m; and
said pitch is approximately 100 $\mu$m, so that said ratio is approximately 0.83.

7. A method as claimed in claim 1 and further comprising:
modulating said at least one varied parameter.

8. A method as claimed in claim 1 and further comprising:
pulsating said at least one varied parameter.

9. A method as claimed in claim 1 wherein said areas of impact of the beam on the roll surface overlap in the axial direction.

10. A method as claimed in claim 9 wherein each turn of the helical path of the area of impact is overlapped by the first following turn and spaced from the second following turn.

* * * * *